United States Patent [19]

Lenkey

[11] 4,004,679
[45] Jan. 25, 1977

[54] MECHANICAL SHOVELS

[76] Inventor: Steven Charles Lenkey, P.O. Box 922, Hamilton, Ontario, Canada, L8N 3P9

[22] Filed: Apr. 18, 1975

[21] Appl. No.: 569,505

[52] U.S. Cl. .................................. 198/509; 37/190; 198/518; 198/710
[51] Int. Cl.² ........................................ B65G 65/04
[58] Field of Search .............. 37/189, 190, 94–96, 37/45; 198/9, 12, 145, 148, 150; 172/546

[56] References Cited

UNITED STATES PATENTS

| | | | |
|---|---|---|---|
| 1,245,656 | 11/1917 | Anderson | 37/190 UX |
| 1,581,685 | 4/1926 | Oldroyd | 198/9 |
| 1,716,390 | 6/1929 | Swanson | 37/45 |
| 1,863,474 | 6/1932 | Curtis | 37/190 X |
| 2,528,012 | 10/1950 | Mensforth | 198/9 |
| 2,738,865 | 3/1956 | Howard | 37/190 X |
| 3,101,142 | 8/1963 | Doyer | 37/190 X |
| 3,896,571 | 7/1975 | Satterwhite | 37/190 |

FOREIGN PATENTS OR APPLICATIONS

| | | | |
|---|---|---|---|
| 452,058 | 11/1927 | Germany | 198/9 |
| 172,042 | 7/1960 | Sweden | 37/190 |

Primary Examiner—Evon C. Blunk
Assistant Examiner—Richard K. Thomson
Attorney, Agent, or Firm—Hirons & Rogers

[57] ABSTRACT

A new mechanical shovel adapted for mounting on a vehicle and for shovelling continuously onto a conveyor consists of a plurality of buckets pivotally mounted equidistantly around an axis to two spaced coaxial cam disc members rotatable by a drive about an axis. These two rotatable members are mounted between and each closely adjacent to another respective coaxial cam disc member also coaxial with the axis. The first-mentioned rotatable cam members have a plurality of cam tracks each for a respective bucket, while the second-mentioned cam members each have a single endless bucket-attitude determining cam track. Each bucket has cam followers each of which cooperates with two cam tracks, one on each member, so that the buckets pivot to the required attitude for shovelling and subsequent discharging as they are rotated about the axis. The inclination of the shovelling part of the bucket path can be changed by rotating the second-mentioned cam members about the axis.

5 Claims, 4 Drawing Figures

MECHANICAL SHOVELS

FIELD OF THE INVENTION

This invention is concerned with improvements in or relating to mechanical shovels, such as are now used extensively in construction, mining, quarrying, dredging and like industries.

REVIEW OF THE PRIOR ART

Mechanical shovels are extensively used in numerous industries, of which the construction, mining, quarrying and dredging industries are only specific examples. The most efficient operation is achieved when the shovelling or digging results in a substantially continuous flow of material from the shovel. A typical prior construction to achieve such operation comprises a plurality of buckets mounted for rotation about an axis and controlled in their attitude as they rotate about the axis to perform the desired shovelling and discharging action, usually onto a conveyor or into some transfer vehicle, such as a truck. Examples of such shovels are described for example, in U.S. patent specifications Serial Nos: 1,414,201; 1,581,685; 1,863,474; 2,738,865; 2,920,736; and 3,476,233.

Despite these numerous prior proposals many industries still employ relatively inefficient single bucket loaders, wherein a single bucket is moving on a pair of arms from a shovelling position and attitude to a discharging position and attitude, both position and attitude being controlled by the operator, presumably because of the lower cost and mechanical simplicity of such machines as compared to the relatively complex multiple proposals, as illustrated by the above-referenced patent specifications.

DEFINITION OF THE INVENTION

It is an object of the invention to provide a new mechanical shovel.

It is a more specific object to provide a new mechanical shovel of simple and robust construction, involving relatively few and simple moving parts to achieve the desired shovelling action.

In accordance with the present invention there is provided a mechanical shovel comprising a frame, a first cam member rotatably mounted by the frame about an axis and providing an endless bucket-attitude controlling cam track having the said axis within its perimeter, means for adjustably fixing the position of the first cam member about the said axis, a second guide member mounted for rotation about the said axis and providing a guide slot extending radially with respect to the said axis, at least one bucket having an open front end and having a rearward extension by which it is pivoted to the second guide member so as to be rotatable therewith about the said axis, and a cam follower on the bucket between its pivot and the said open front end, engaging the said cam track and the guide slot and cooperating therewith to hold the bucket with its open front end in shovelling attitude and to move it in a shovelling action parallel to a surface over which the shovel extends upon rotation of the second guide member, the first cam member being rotatable about the said axis of rotation to change the inclination of the shovelling action of the said bucket, and means for rotating the second guide member.

Preferably the shovel comprises two spaced first cam members, two spaced coaxial second cam members disposed between the first cam members each closely adjacent to a respective first cam member, the said bucket being mounted between and pivoted to the two second cam members and the bucket being provided with two cam followers each cooperating with a respective pair of first and second cam members.

Preferably also the shovel comprises a plurality of buckets, wherein the first cam member comprises a single continuous cam track engaged by the cam followers of all of the buckets, and the second cam member comprises a plurality of cam tracks each engaged by the cam follower of a different bucket.

DESCRIPTION OF THE DRAWINGS

A mechanical shovel which is a particular preferred embodiment of the invention will now be described by way of example, with reference to the accompanying diagrammatic drawings, wherein.

DESCRIPTION OF THE PREFERRED EMBODIMENTS

Figure 1:
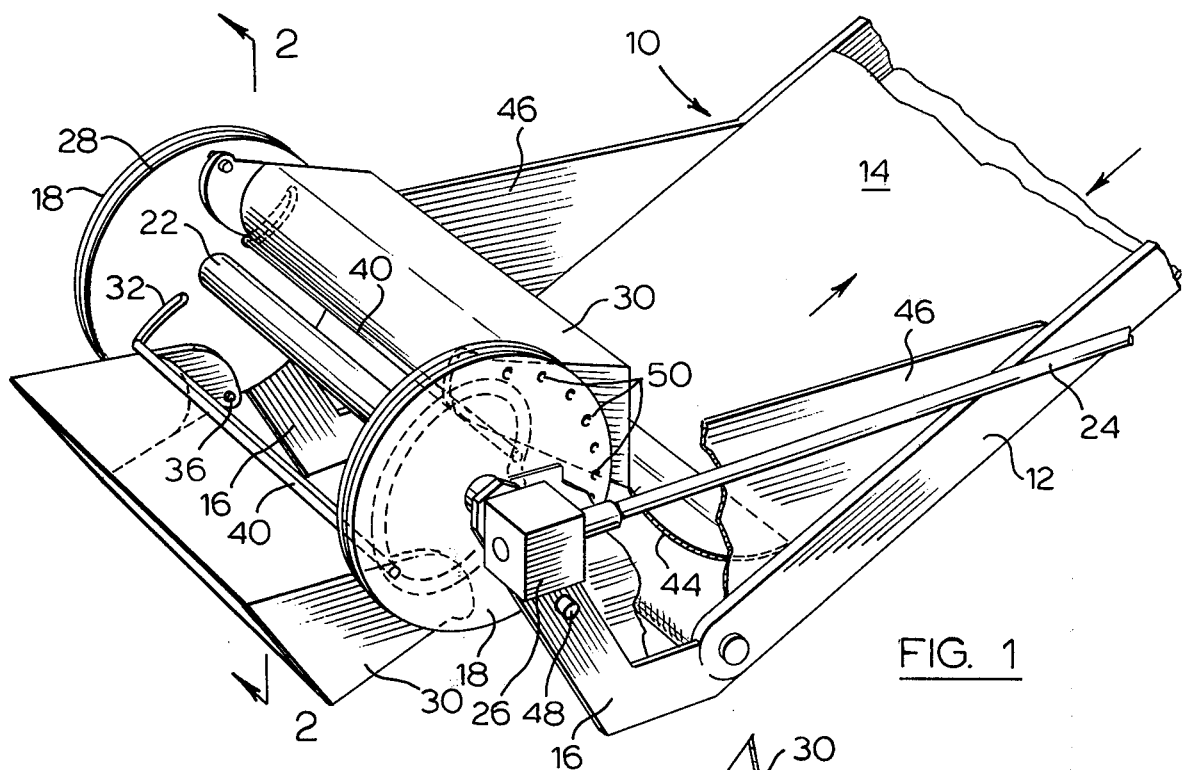
FIG. 1 is a perspective view showing the shovel of the invention arranged to feed shovelled material directly onto a conveyor.

The particular preferred embodiment illustrated is shown as feeding directly on to an elevating conveyor 10 constituted by a frame 12 and a belt 14 which is driven by any suitable motor (not illustrated). The shovel and the conveyor can, for example, be mounted at the front end of a suitable motor vehicle, such as a tractor, and arranged to feed the shovelled material directly into a series of trucks which are positioned successively behind the vehicle, the vehicle moving as required to maintain the shovel operating at maximum capacity. It will be apparent that such an arrangement has the capacity for continuous shovelling and conveyance, as compared with an intermittently operated device, so that its ouput for a given shovel size is considerably increased.

In this embodiment the mechanical shovel is illustrated as mounted on the conveyor frame 12 by means of two parallel arms 16, although other mounting arrangements can of course be employed, depending for example upon the particular application and type of vehicle upon which the shovel is mounted. Each arm 16 has mounted thereon to be stationary relative thereto a first fixed circular, disc-like cam member 18, each providing a respective endless cam track 20. A drive shaft 22 passes through the centres of the cam members 18 and is rotatably mounted to the arms 16 by bearings which are not shown. In this particular embodiment the shaft 22 is illustrated as driven from a suitable power take-off shaft 24 via an angle gear box 26, although other equally suitable driving arrangements will be readily apparent to those skilled in the art.

Two second rotary circular, disc-like cam members 28 are fixed to the shaft 22 to be rotatable therewith, each second cam member being parallel, closely adjacent to, and coaxial with a respective one of the two stationary cam members 18. This embodiment is shown as comprising two buckets 30 although in other embodiments only one bucket, or more than two buckets, may be employed. Since two buckets are provided the rotatable cam member is provided with two corresponding radially-extending cam tracks 32 for cooperation with the cam tracks 20, to provide a bucket-attitude controlling cam means, as will be explained below. The buckets are of any suitable shape to cooperate with the said cam means in providing the necessary scooping or shovelling action relative to material disposed in front of the shovel, and each is pivoted to the two rotary cam members 28 by coaxial pivot pins 36 mounted in rearward extensions 38 thereof.

Each bucket also has mounted thereon two coaxial cam followers, constituted in this embodiment by a single continuous rod 40, which are engaged in both sets of cam tracks 20 and 32, and control the pivoting of the buckets about their pivots 36 as the cam members 28 are rotated by the shaft 22.

Figure 2:
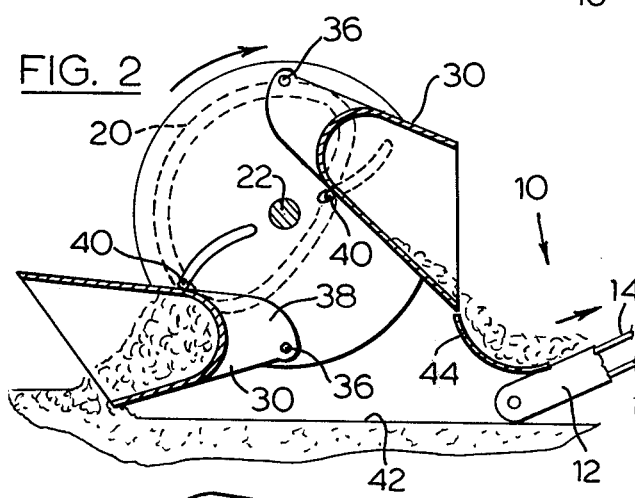
FIG. 2 is a section taken on the line 2—2 of FIG. 1.
Figure 3:
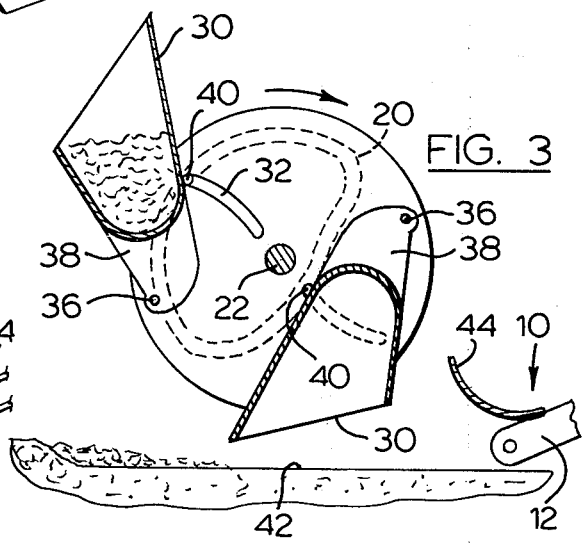
FIG. 3 is a similar section to that of FIG. 2 showing the shovels in a different location.
Figure 4:
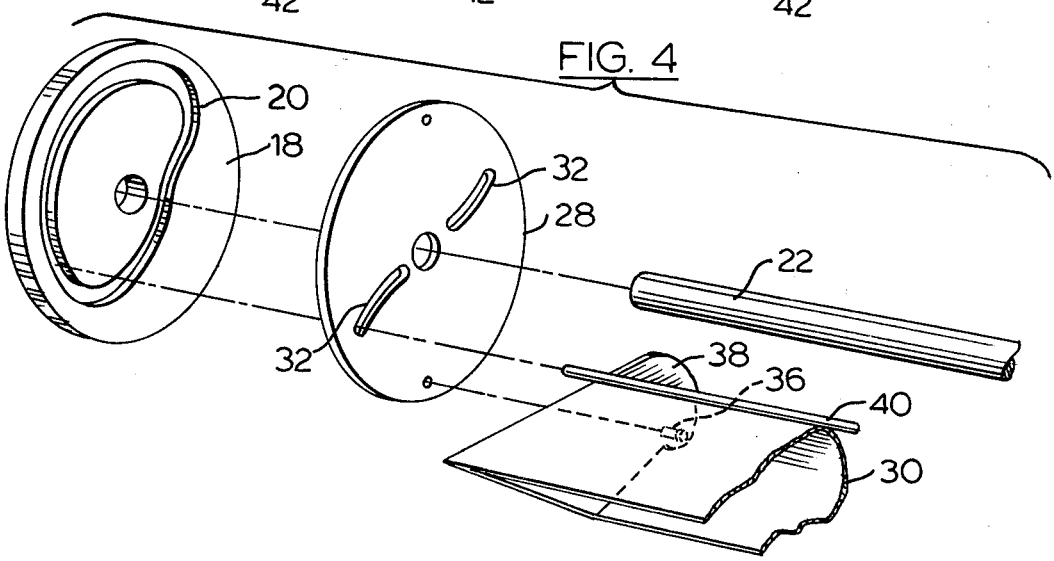
FIG. 4 is an exploded partial view to show detail of the construction.

Referring now especially to FIGS. 2 and 3, in this embodiment the stationary cam member is set to provide a shovelling action parallel to the ground surface 42, so that the two buckets will pick up material disposed on that surface. The shape of the cam track 20 is primarily operative in determining the attitude of the buckets as they are rotated, and it will be seen from FIG. 4 that immediately upon shovelling horizontally to the fullest extent each bucket is tilted to a vertical attitude to retain the contents therein. This vertical attitude is thereafter maintained until the bucket has reached the rear side, whereupon it is tilted almost vertically to discharge its contents on to the conveyor 10, spillage to the ground being prevented by a receptor plate 44 and side plates 46. The radial extent of each cam track 32 corresponds to that of the endless track 20 and comprises an arc struck about the axis of the respective pivot 36.

As described, the mechanical shovel is set to shovel a horizontal ground surface, but it can be set to shovel inclined or vertical or horizontal ceiling surfaces by rotation of the cam members 18 about the axis of the shaft 18. In this embodiment the cam members 18 can be located in the different required positions by means of removable pins 48 carried by the arms 16 which engage in holes 50 in the cam members. In other embodiments infinite control of the rotational position of the first cam member may be provided, for example by means of a controllable motor connected to the cam member by an irreversible-drive gearing.

I claim:

1. A mechanical shovel comprising a frame, a first cam member rotatably mounted by the frame about an axis and providing an endless bucket-attitude controlling cam track having the said axis within its perimeter, means for adjustably fixing the position of the first cam member about the said axis, a second guide member mounted for rotation about the said axis and providing a guide slot extending radially with respect to the said axis, at least one bucket having an open front end and having a rearward extension by which it is pivoted to the second guide member so as to be rotatable therewith about the said axis, and a cam follower on the bucket between its pivot and said open front end, engaging the said cam track and the guide slot and cooperating therewith to hold the bucket with its open front end in shovelling attitude and to move it in a shovelling action parallel to a surface over which the shovel extends upon rotation of the second guide member, the first cam member being rotatable about the said axis of rotation to change the inclination of the shovelling action of the said bucket, and means for rotating the second guide member.

2. A mechanical shovel as claimed in claim 1, and comprising two spaced first cam members rotatably mounted about a common axis, means for adjustably fixing the positions of the said first cam members about the said common axis, two spaced coaxial second guide members disposed between the first cam members each closely adjacent to a respective first cam member, the said bucket being mounted between and having respective rearward extensions pivoted to the second guide members, and the bucket being provided with two cam followers each cooperating with a respective pair of closely adjacent first and second members.

3. A mechanical shovel as claimed in claim 1, and comprising a plurality of the said buckets, wherein the single continuous cam track of the first cam member is engaged by the cam followers of all of the said buckets, and the second guide member comprises a plurality of radially extending guide slots, each engaged by the cam follower of a different bucket.

4. A mechanical shovel as claimed in claim 1, comprising two spaced first cam members rotatably mounted about a common axis, means for adjustably fixing the positions of the said first cam members about the said common axis, two spaced coaxial second guide members disposed between the first cam members each closely adjacent to a respective first cam member, and a plurality of the said buckets each mounted between and pivoted to the two second guide members, each of the said buckets being provided with two cam followers each cooperating with a respective pair of closely adjacent first and second members.

5. A mechanical shovel as claimed in claim 4, wherein the single continuous cam track of the first cam member is engaged by the cam followers of all of the said buckets, and the second guide member comprises a plurality of radially extending guide slots each engaged by the cam follower of a different bucket.

* * * * *